United States Patent [19]
Ishigaki et al.

[11] Patent Number: 5,239,556
[45] Date of Patent: Aug. 24, 1993

[54] DEMODULATION SYSTEM FOR SPREAD SPECTRUM COMMUNICATION

[75] Inventors: Yukinobu Ishigaki, Miura; Takahisa Matsumoto, Yokohama, both of Japan

[73] Assignee: Victor Company of Japan, Ltd., Yokohama, Japan

[21] Appl. No.: 813,735

[22] Filed: Dec. 27, 1991

[30] Foreign Application Priority Data

Dec. 28, 1990 [JP] Japan .................................. 2-417573
Mar. 26, 1991 [JP] Japan .................................. 3-86096
Apr. 26, 1991 [JP] Japan .................................. 3-125402

[51] Int. Cl.[5] .............................................. H04K 1/00
[52] U.S. Cl. ................................................... 375/1
[58] Field of Search ........................................ 375/1

[56] References Cited

U.S. PATENT DOCUMENTS

| | | | |
|---|---|---|---|
| 4,532,635 | 7/1985 | Mangulis | 375/1 |
| 4,587,661 | 5/1986 | Schiff | 375/1 |
| 4,617,674 | 1/1986 | Mangulis et al. | 375/1 |
| 4,804,938 | 2/1989 | Rouse et al. | 375/1 |
| 5,128,957 | 7/1992 | Nakagawa | 375/1 |

Primary Examiner—David Cain
Attorney, Agent, or Firm—Lowe, Price, LeBlanc & Becker

[57] ABSTRACT

A demodulation system for spread spectrum communication includes a first low pass filter for processing an input spread spectrum signal including a product of an information signal and a first spread code. A second spread code is generated which is equivalent to the first spread code. A second low pass filter processes the second spread code and has a transfer function substantially equal to a transfer function of the first low pass filter. An absolute value circuit derives an absolute value of an output signal from the second low pass filter. A division circuit derives a reciprocal of an output signal from the absolute value circuit. A delay circuit delays the second spread code by a predetermined time. A first multiplier multiplies an output signal from the division circuit and an output signal from the delay circuit, and generates a third spread code in response to the output signals from the division circuit and the delay circuit. A second multiplier multiplies an output signal from the first low pass filter and the third spread code, despreading the output signal from the first low pass filter with the third spread code and recovering the information signal from the output signal of the first low pass filter.

9 Claims, 10 Drawing Sheets

FIG. 7(A) a1
FIG. 7(B) b1
FIG. 7(C) c1
FIG. 7(D) d1
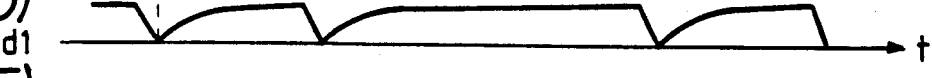
FIG. 7(E) e1
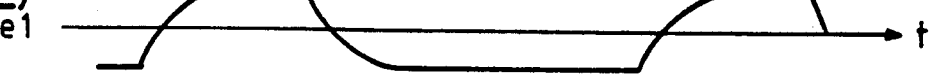
FIG. 7(F) f1
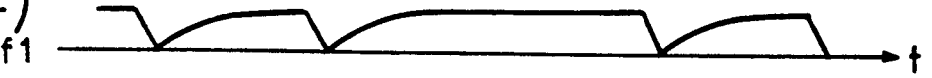
FIG. 7(G) g1
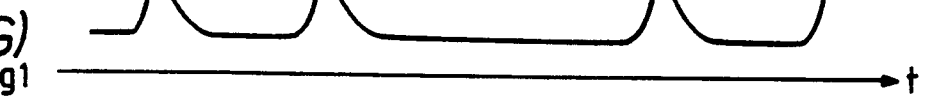
FIG. 7(H) h1
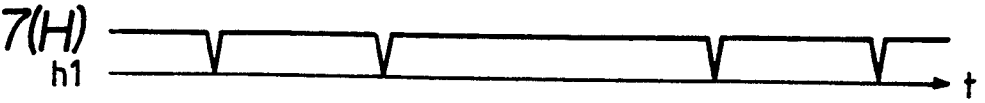

FIG. 9(A) a2
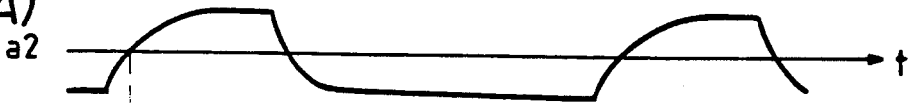
FIG. 9(B) b2
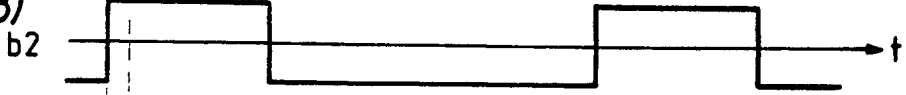
FIG. 9(C) c2
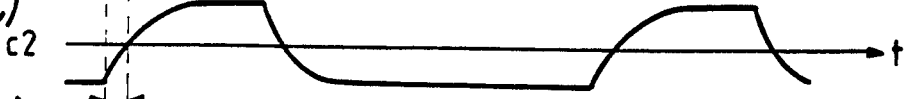
FIG. 9(D) d2
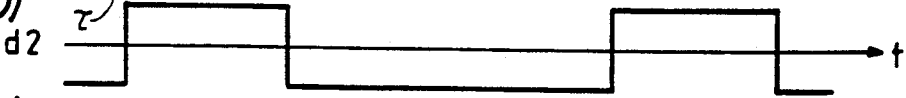
FIG. 9(E) e2
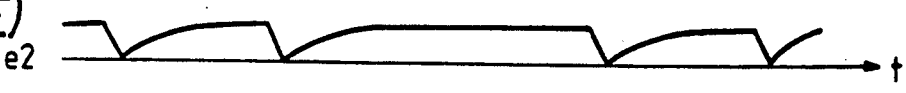
FIG. 9(F) f2
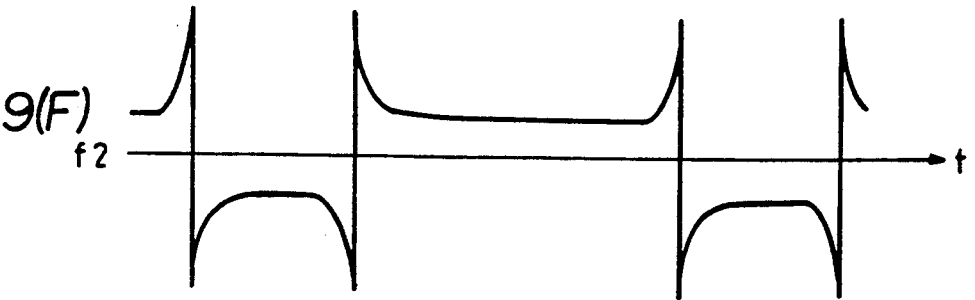
FIG. 9(G) g2
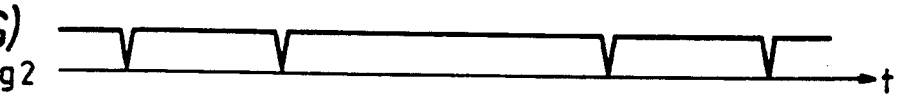

DEMODULATION SYSTEM FOR SPREAD SPECTRUM COMMUNICATION

BACKGROUND OF THE INVENTION

1. Field of the Invention

This invention relates to a demodulation system for spread spectrum communication.

2. Description of the Prior Art

In typical spread spectrum communication, a transmitter side modulates an information signal with a spread code (a pseudonoise code, a PN code) and thereby converts the information signal into a spread spectrum signal. The spread spectrum signal is transmitted from the transmitter side to a receiver side. The receiver side generates a spread code which corresponds to the spread code used in the transmitter side. The receiver side despreads the received spread spectrum signal with the spread code to recover the information signal from the spread spectrum signal.

Spread spectrum communication has the following advantages. If a jamming signal is present in the frequency band of a spread spectrum signal, the spread spectrum signal is hardly affected by the jamming signal so that information components of the spread spectrum signal can be accurately maintained. When a plurality types of PN codes are used, spread spectrum signals can be multiplexed in a common frequency band.

Generally, in spread spectrum communication, it is necessary that an information signal is spread into a frequency band sufficiently wider than the original frequency band thereof. In fact, most of cases require a certain limitation on the frequency band of a spread spectrum signal. The limitation on the frequency band causes a distortion of the waveform of the spread spectrum signal. In a receiver side, such a waveform distortion adversely affects a despreading process, and thus a recovered information signal is contaminated by bit clock components of a PN code. The contamination of the recovered information signal results in a decrease in the information demodulation efficiency.

SUMMARY OF THE INVENTION

It is an object of this invention to provide an improved demodulation system for spread spectrum communication.

A first aspect of this invention provides a demodulation system for spread spectrum communication which comprises a first low pass filter for processing an input spread spectrum signal including a product of an information signal and a first spread code; means for generating a second spread code equivalent to the first spread code; a second low pass filter for processing the second spread code and having a transfer function substantially equal to a transfer function of the first low pass filter; an absolute value circuit for deriving an absolute value of an output signal from the second low pass filter; a division circuit for deriving a reciprocal of an output signal from the absolute value circuit; a delay circuit for delaying the second spread code by a predetermined time; a first multiplier for multiplying an output signal from the division circuit and an output signal from the delay circuit, and for generating a third spread code in response to the output signals from the division circuit and the delay circuit; and a second multiplier for multiplying an output signal from the first low pass filter and the third spread code, for despreading the output signal from the first low pass filter with the third spread code, and for recovering the information signal from the output signal of the first low pass filter.

A second aspect of this invention provides a demodulation system for spread spectrum communication which comprises a first low pass filter for processing an input spread spectrum signal including a product of an information signal and a first spread code; means for generating a second spread code equivalent to the first spread code; a second low pass filter for processing the second spread code and having a transfer function substantially equal to a transfer function of the first low pass filter; an absolute value circuit for deriving an absolute value of an output signal from the second low pass filter; a comparator for comparing the output signal from the second low pass filter and a predetermined reference signal; an inverter for inverting an output signal from the comparator; a division circuit for executing a division between an output signal from the absolute value circuit and an output signal from the inverter, and for generating a third spread code in response to the output signals from the absolute value circuit and the inverter; and a second multiplier for multiplying an output signal from the first low pass filter and the third spread code, for despreading the output signal from the first low pass filter with the third spread code, and for recovering the information signal from the output signal of the first low pass filter.

A third aspect of this invention provides a demodulation system for spread spectrum communication which comprises a first low pass filter for processing an input spread spectrum signal including a product of an information signal and a first spread code; means for generating a second spread code equivalent to the first spread code; a delay circuit for delaying the second spread code by a predetermined time; a first multiplier for multiplying an output signal from the first low pass filter and an output signal from the delay circuit; a second low pass filter for processing the second spread code and having a transfer function substantially equal to a transfer function of the first low pass filter; an absolute value circuit for deriving an absolute value of an output signal from the second low pass filter; a division circuit for deriving a reciprocal of an output signal from the absolute value circuit; and a second multiplier for multiplying an output signal from the first multiplier and an output signal from the division circuit, and for recovering the information signal from the output signal of the first multiplier.

A fourth aspect of this invention provides a demodulation system for spread spectrum communication which comprises a low pass filter for processing an input spread spectrum signal including a product of an information signal and a first spread codes, wherein the first spread code in the input spread spectrum signal undergoes a change during the processing by the low pass filter; means for generating a second spread code equivalent to the first spread code; means for correcting the second spread code into a third spread code in accordance with said change; and means for despreading an output signal of the low pass filter with the third spread code to recover the information signal from the output signal of the low pass filter.

A fifth aspect of this invention provides a demodulation system for spread spectrum communication which comprises a first low pass filter for processing an input spread spectrum signal which includes a product of an information signal and a first spread code and which also includes an interference signal; means for generating a second spread code equivalent to the first spread code; a second low pass filter for processing the second spread code into a third spread code and having a transfer function substantially equal to a transfer function of the first low pass filter; a reciprocal circuit for deriving a reciprocal of an output signal from the second low pass filter; a first multiplier for multiplying an output signal from the first low pass filter and an output signal from the reciprocal circuit, and for despreading the output signal from the first low pass filter with the output signal from the reciprocal circuit; a low cut filter for processing an output signal from the first multiplier, and for removing a component of the output signal from the first multiplier which corresponds to a demodulation of the information signal; a second multiplier for multiplying the third spread code and an output signal from the low cut filter; a high cut filter for processing an output signal from the second multiplier; a third multiplier for multiplying the output signal from the reciprocal circuit and an output signal from the high cut filter, and for generating a spectrum of a spread of the interference signal in response to the output signals from the reciprocal circuit and the high cut filter; an equalizer for processing an output signal from the third multiplier, and for correcting the spread spectrum of the interference signal into a spread spectrum which is substantially equal to a spectrum of a spread of the interference signal contained in the output signal from the first multiplier; a subtracter for executing a subtraction between the output signal from the first multiplier and an output signal from the equalizer; and a third low pass filter for recovering the information signal from an output signal of the subtracter.

A sixth aspect of this invention provides a spread spectrum communication system comprising a serial-parallel converter for separating an input serial information signal into N sub information signals; means for spreading the N sub information signals with first N different spread codes to covert the N sub information into N spread spectrum modulation signals respectively; means for adding the N spread spectrum modulation signals into a sum spread spectrum modulation signal; a low pass filter for processing the sum spread spectrum modulation signal; N demodulation circuits for recovering the N sub information signals from an output signal of the low pass filter; and a parallel-serial converter for combining the recovered N sub information signals into the recovered input serial information signal; wherein the N demodulation circuits comprise means for generating second N spread codes which are equivalent to the first N spread codes respectively, means for despreading the output signal of the low pass filter with the second N spread codes respectively, and means for reducing inter-code interference noise in output signals from the despreading means respectively, and for deriving the recovered N sub information signals from the output signals of the despreading means.

BRIEF DESCRIPTION OF THE DRAWINGS

FIG. 7 is a time domain diagram showing the waveforms of various signals in the demodulation system of FIG. 6.

FIG. 9 is a time domain diagram showing the waveforms of various signals in the demodulation system of FIG. 8.

DESCRIPTION OF THE FIRST PREFERRED EMBODIMENT

Figure 1:
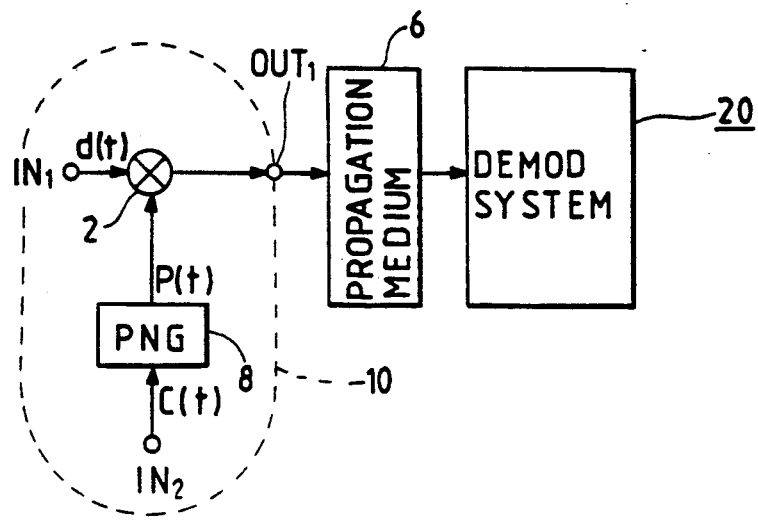
FIG. 1 is a block diagram of a spread spectrum modulation system, a propagation medium, and a spread spectrum demodulation system according to a first embodiment of this invention.

With reference to FIG. 1, a spread spectrum modulation system 10 includes a multiplier 2, acting as a mixer, and a pseudonoise generator (PNG, a spread code generator) 8.

The PNG 8 generates a spread code or a PN code $P(t)$ on the basis of a clock signal $C(t)$ fed via an input terminal In2. The PNG 8 outputs the spread code $P(t)$ to the multiplier 2. The multiplier 2 receives an information signal $d(t)$ via an input terminal In1. The multiplier 2 multiplies the information signal $d(t)$ and the spread code $P(t)$, modulating the information signal $d(t)$ with the spread code $P(t)$ and thereby converting the information signal $d(t)$ into a spread spectrum (SS) modulation signal $d(t) \cdot P(t)$. The mixer 2 feeds the SS modulation signal $d(t) \cdot P(t)$ to an output terminal Out1. The SS modulation signal $d(t) \cdot P(t)$ is transmitted from the modulation system 10 to a propagation medium 6 via the output terminal Out1.

A spread spectrum demodulation system 20 receives the SS modulation signal $d(t) \cdot P(t)$ via the propagation medium 6. The propagation medium 6 may be replaced by another medium such as a transmission line or a recording medium.

Figure 2:
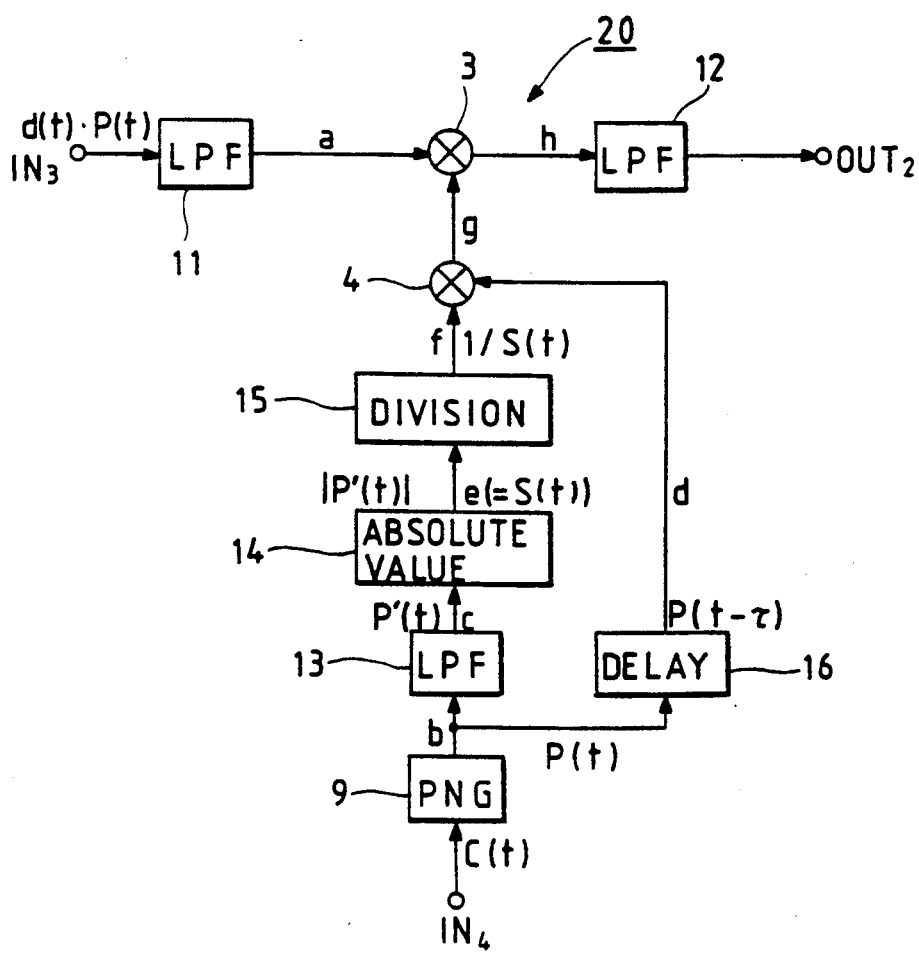
FIG. 2 is a block diagram of the demodulation system in FIG. 1.

As shown in FIG. 2, the demodulation system 20 includes a multipliers 3 and 4, a PNG 9, low pass filters 11, 12, and 13, an absolute value circuit 14, a division circuit 15, and a delay circuit 16.

Figure 3:
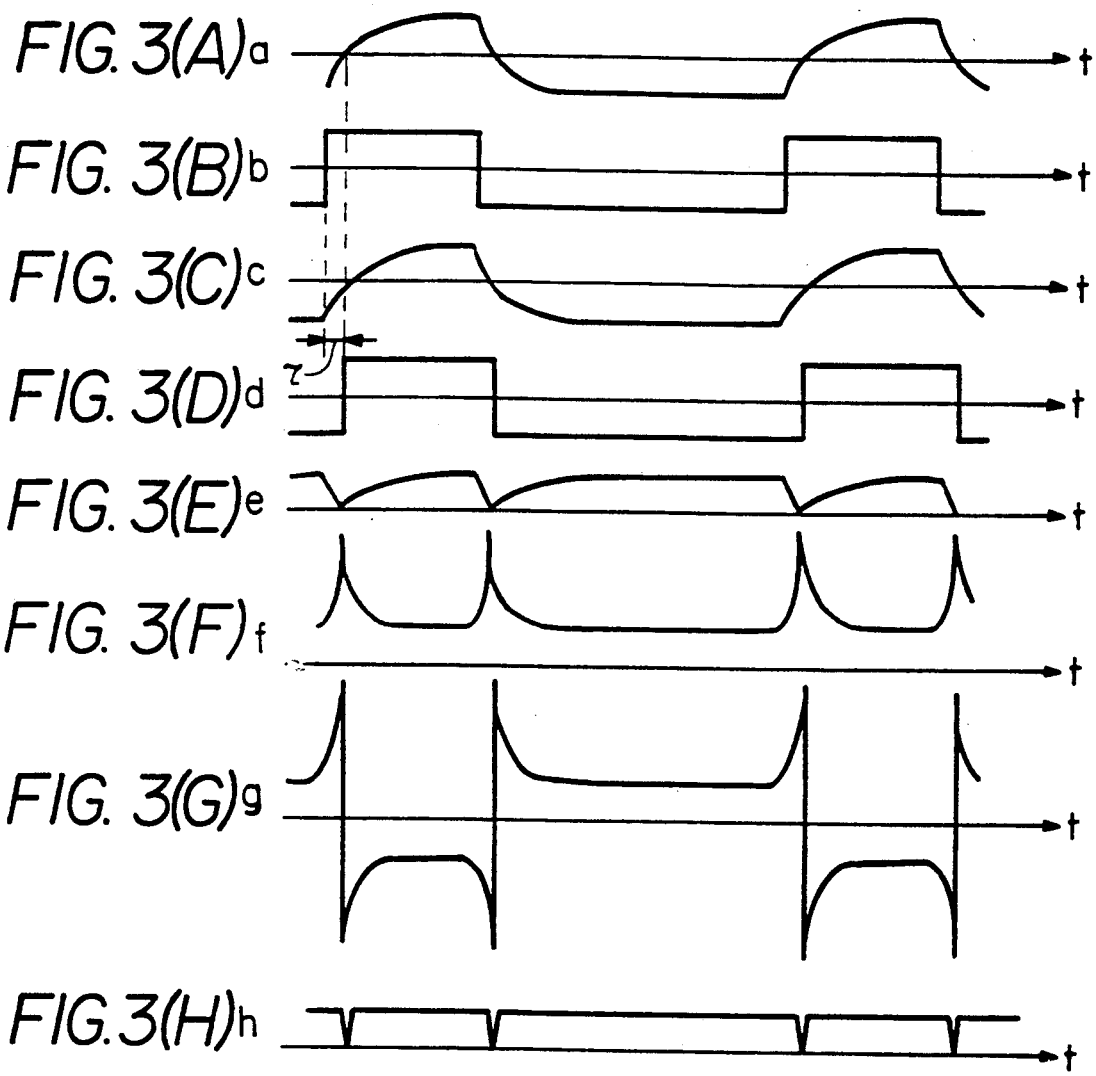
FIG. 3 is a time domain diagram showing the waveforms of various signals in the demodulation system of FIG. 2.

A received SS modulation signal $d(t) \cdot P(t)$ is fed from an input terminal In3 to the low pass filter 11. High frequency components of the SS modulation signal $d(t) \cdot P(t)$ are removed by the low pass filter 11. In other words, the SS modulation signal $d(t) \cdot P(t)$ is differentiated by the low pass filter 11, and is thereby converted into a second SS modulation signal $\{d(t) \cdot P(t)\}'$. Since the rate of a variation in the information signal $d(t)$ is much smaller than that in the spread code P(t), the second SS modulation signal is approximately expressed as d(t)·P(t)'. In FIG. 2, the second SS modulation signal d(t)·P(t)' is also denoted by the character "a". The second SS modulation signal "a" has a waveform such as shown in the part (A) of FIG. 3. The second SS modulation signal "a" is fed from the low pass filter 11 to the multiplier 3.

The low pass filter 11 serves to limit the frequency band of the input SS modulation signal d(t)·P(t). Generally, in spread spectrum communication, a range of frequencies up to the reciprocal of a bit clock period T is referred to as a main lobe of the frequency band of a spread spectrum signal. It is preferable that the low pass filter 11 remove components of the SS modulation signal d(t)·P(t) which have frequencies higher than the main lobe of the frequency band thereof. A general PN code is composed of a given sequence of several hundreds of bits each having a level of either +1 or −1. These bits have a constant period which is referred to as a bit clock period T.

The PNG 9 receives a clock signal C(t) via an input terminal In4, the received clock signal being equivalent to and synchronous with the clock signal in the modulation system 10. The PNG 9 generates a spread code P(t) on the basis of the clock signal C(t). In FIG. 2, the generated spread code P(t) is also denoted by the character "b". The spread code "b" has a waveform such as shown in the part (B) of FIG. 3.

The spread code "b" is fed from the PNG 9 to the low pass filter 13 and the delay circuit 16. The delay circuit 16 delays the spread code "b" by a given time "τ", outputting a delayed spread code P(t−τ). In FIG. 2, the output spread code P(t−τ) from the delay circuit 16 is also denoted by the character "d". The spread code "d" has a waveform such as shown in the part (D) of FIG. 3. The spread code "d" is fed from the delay circuit 16 to the multiplier 4.

High frequency components of the output spread code "b" from the PNG 9 are removed by the low pass filter 13. The low pass filter 13 is designed so that the transfer function thereof is substantially equal to the transfer function of the low pass filter 11. The output spread code P(t) from the PNG 9 is differentiated by the low pass filter 13, and is thereby converted into a second spread code P(t)'. In FIG. 2, the second spread code P(t)' is also denoted by the character "c". The second spread code "c" has a waveform such as shown in the part (C) of FIG. 3. The second spread code "c" is fed from the low pass filter 13 to the absolute value circuit 14.

The absolute value circuit 14 inverts negative portions of the spread code "c" but passes positive portions of the spread code "c" as they are. Thus, the absolute value circuit 14 converts the spread code P(t)' into an absolute value spread code S(t) which is equal to the absolute value |P(t)'| of the spread code P(t)'. In FIG. 2, the absolute value spread code S(t) is also denoted by the character "e". The absolute value spread code "e" has a waveform such as shown in the part (E) of FIG. 3. The absolute value spread code "e" is fed from the absolute value circuit 14 to the division circuit 15.

The division circuit 15 processes the absolute value spread code S(t) through reciprocal-calculating division, outputting a spread code reciprocal signal 1/S(t) which is equal to the reciprocal of the absolute value spread code S(t). In FIG. 2, the output spread code reciprocal signal 1/S(t) from the division circuit 15 is also denoted by the character "f". The output spread code reciprocal signal "f" from the division circuit 15 has a waveform such as shown in the part (F) of FIG. 3. The spread code reciprocal signal "f" is fed from the division circuit 15 to the multiplier 4.

From the theoretical standpoint, when S(t)=0, the value of 1/S(t) is infinite. In fact, circuit frequency response characteristics, circuit dynamic ranges, and other factors provide a certain upper limit of the value of 1/S(t). Thus, great levels of the spread code reciprocal signal "f" are limited as shown in the part (F) of FIG. 3.

The multiplier 4 multiplies the delayed spread code P(t−τ) and the spread code reciprocal signal 1/S(t), outputting a signal having a value of 1/P(t)'. It should be noted the details of the calculation of deriving the value 1/P(t)' from the values P(t−τ) and 1/S(t) are omitted. In FIG. 2, the output signal 1/P(t)' from the multiplier 4 is also denoted by the character "g". The output signal "g" from the multiplier 4 has a waveform such as shown in the part (G) of FIG. 3. The output signal "g" from the multiplier 4 is fed to the multiplier 3, and will be used as a final spread code.

The multiplier 3 multiplies the SS modulation signal d(t)·P(t)' and the final spread code 1/P(t)', despreading the SS modulation signal with the final spread code and thereby recovering the information signal d(t). In FIG. 2, the recovered information signal d(t) is also denoted by the character "h". The recovered information signal "h" has a waveform such as shown in the part (H) of FIG. 3. In fact, as shown in the part (H) of FIG. 3, the recovered information signal "h" has small and negligible spike-shaped switching components which result from the previously-mentioned circuit frequency response characteristics, circuit dynamic ranges, and other factors.

The information signal "h" is fed from the multiplier 3 to the low pass filter 12. The information signal "h" is processed by the low pass filter 12. The output signal from the low pass filter 12 is transmitted from the demodulation system 20 to an external circuit (not shown) via an output terminal Out2. It is sufficient that the low pass filter 12 has a broad frequency cutoff characteristic and a simple structure. It should be noted that the low pass filter 12 may be omitted and the recovered information signal "h" may be directly outputted from the demodulation system 20.

Figure 4:
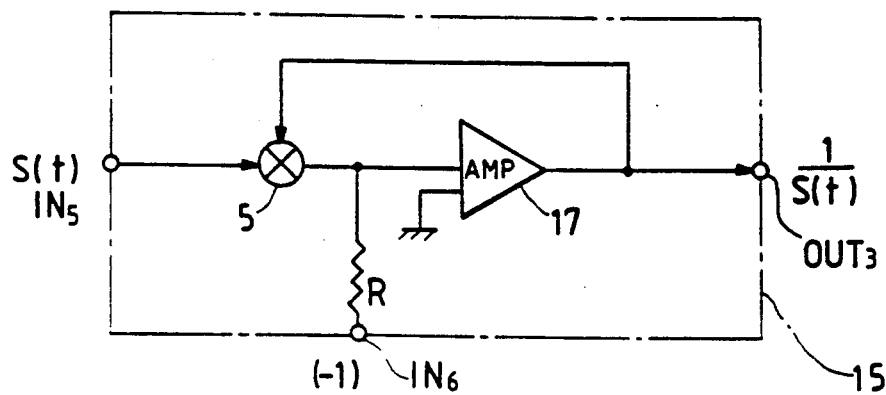
FIG. 4 is a block diagram of the division circuit in FIG. 2.

As shown in FIG. 4, the division circuit 15 includes a multiplier 5, a resistor R, and an inverting amplifier 17. The multiplier 5 receives the output signal S(t) from the absolute value circuit 14 (see FIG. 2) via an input terminal In5. The multiplier 5 multiplies the signal S(t) and the output signal from the amplifier 17. The output signal from the multiplier 5 is fed to the input terminal of the amplifier 17. In addition, a reference voltage corresponding to a signal −1 is fed to the input terminal of the amplifier 17 via an input terminal In6 and the resistor R. The output signal from the amplifier 17 is transmitted via an output terminal Out3 to the multiplier 4 (see FIG. 2). In addition, the output signal from the amplifier 17 is fed back to the multiplier 5. The output signal from the amplifier 17 is equal to the spread code reciprocal signal 1/S(t).

DESCRIPTION OF THE SECOND PREFERRED EMBODIMENT

Figure 5:
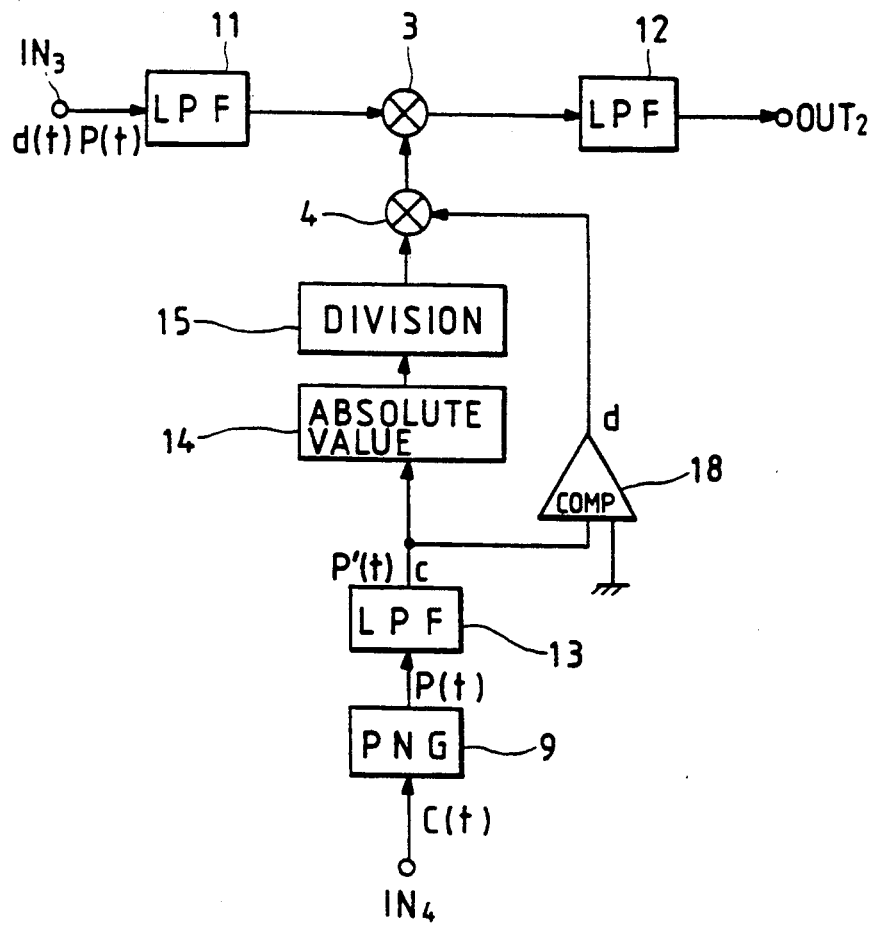
FIG. 5 is a block diagram of a spread spectrum demodulation system according to a second embodiment of this invention.

FIG. 5 shows a second embodiment of this invention which is similar to the embodiment of FIGS. 1-4 except for the following design changes. The embodiment of FIG. 5 uses a comparator 18 in place of the delay circuit 16 (see FIG. 2).

As shown in FIG. 5, the output spread code "c" from a low pass filter 13 is also fed to a first input terminal of the comparator 18. A second input terminal of the comparator 18 is subjected to a reference voltage (a ground potential) 0. The comparator 18 compares the spread code "c" (see the part (C) of FIG. 3) and the reference voltage 0, outputting a delayed spread code "d" which has a waveform such as shown in the part (D) of FIG. 3. Specifically, the comparator 18 outputs a signal $+1$ when the spread code "c" assumes a positive level, and outputs a signal $-1$ when the spread code "c" assumes a negative or zero level. The delayed spread code "d" has a level $P(t-\tau)$. The delayed spread code $P(t-\tau)$ is fed from the comparator 18 to a multiplier 4.

DESCRIPTION OF THE THIRD PREFERRED EMBODIMENT

Figure 6:
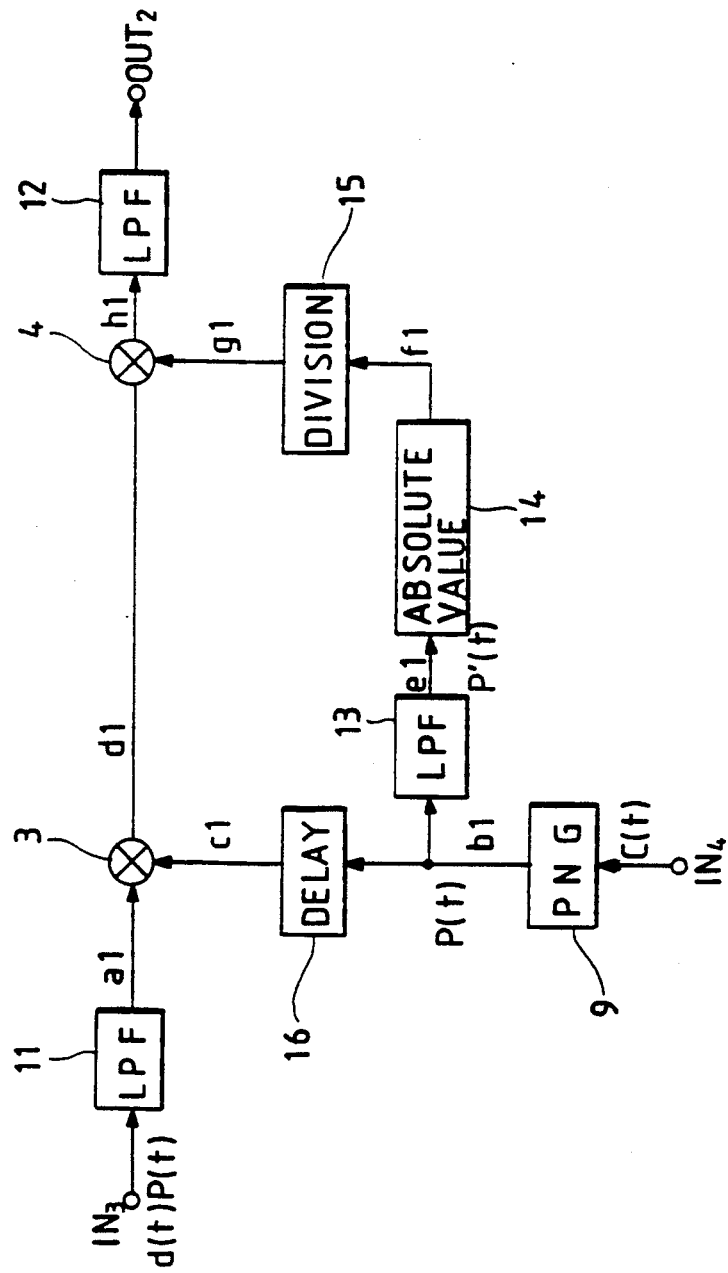
FIG. 6 is a block diagram of a spread spectrum demodulation system according to a third embodiment of this invention.

FIG. 6 shows a third embodiment of this invention which is similar to the embodiment of FIGS. 1-4 except for design changes indicated hereinafter.

In the embodiment of FIG. 6, a received SS modulation signal $d(t) \cdot P(t)$ is fed from an input terminal In3 to a low pass filter 11. High frequency components of the SS modulation signal $d(t) \cdot P(t)$ are removed by the low pass filter 11. In other words, the SS modulation signal $d(t) \cdot P(t)$ is differentiated by the low pass filter 11, and is thereby converted into a second SS modulation signal $\{d(t) \cdot P(t)\}'$. Since the rate of a variation in the information signal $d(t)$ is much smaller than that in the spread code $P(t)$, the second SS modulation signal is approximately expressed as $d(t) \cdot P(t)'$. In FIG. 6, the second SS modulation signal $d(t) \cdot P(t)'$ is also denoted by the character "a1". The second SS modulation signal "a1" has a waveform such as shown in the part (A) of FIG. 7. The second SS modulation signal "a1" is fed from the low pass filter 11 to a multiplier 3.

The low pass filter 11 serves to limit the frequency band of the input SS modulation signal $d(t) \cdot P(t)$. Generally, in spread spectrum communication, a range of frequencies up to the reciprocal of a bit clock period T is referred to as a main lobe of the frequency band of a spread spectrum signal. It is preferable that the low pass filter 11 removes components of the SS modulation signal $d(t) \cdot P(t)$ which have frequencies higher than the main lobe of the frequency band thereof.

A PNG 9 receives a clock signal $C(t)$ via an input terminal In4, the received clock signal being equivalent to and synchronous with the clock signal in a modulation system 10 (see FIG. 1). The PNG 9 generates a spread code $P(t)$ on the basis of the clock signal $C(t)$. In FIG. 6, the generated spread code $P(t)$ is also denoted by the character "b1". The spread code "b1" has a waveform such as shown in the part (B) of FIG. 7.

The spread code "b1" is fed from the PNG 9 to a low pass filter 13 and a delay circuit 16. The delay circuit 16 delays the spread code "b1" by a given time "$\tau$", outputting a delayed spread code $P(t-\tau)$. In FIG. 2, the output spread code $P(t-\tau)$ from the delay circuit 16 is also denoted by the character "c1". The spread code "c1" has a waveform such as shown in the part (C) of FIG. 7. The spread code "c1" is fed from the delay circuit 16 to the multiplier 3.

High frequency components of the output spread code "b1" from the PNG 9 are removed by the low pass filter 13. The low pass filter 13 is designed so that the transfer function thereof is substantially equal to the transfer function of the low pass filter 11. The output spread code $P(t)$ from the PNG 9 is differentiated by the low pass filter 13, and is thereby converted into a second spread code $P(t)'$. In FIG. 6, the second spread code $P(t)'$ is also denoted by the character "e1". The second spread code "e1" has a waveform such as shown in the part (E) of FIG. 7. The second spread code "e1" is fed from the low pass filter 13 to an absolute value circuit 14.

The obsolute value circuit 14 inverts negative portions of the spread code "e1" but passes positive portions of the spread code "e1" as they are. Thus, the absolute value circuit 14 converts the spread code $P(t)'$ into an absolute value spread code $S(t)$ which is equal to the absolute value $|P(t)'|$ of the spread code $P(t)'$. In FIG. 6, the absolute value spread code $S(t)$ is also denoted by the character "f1". The absolute value spread code "f1" has a waveform such as shown in the part (F) of FIG. 7. The absolute value spread code "f1" is fed from the absolute value circuit 14 to a division circuit 15.

The division circuit 15 processes the absolute value spread code $S(t)$ through reciprocal-calculating division, outputting a spread code reciprocal signal $1/S(t)$ which is equal to the reciprocal of the absolute value spread code $S(t)$. In FIG. 6, the output spread code reciprocal signal $1/S(t)$ from the division circuit 15 is also denoted by the character "g1". The output spread code reciprocal signal "g1" from the division circuit 15 has a waveform such as shown in the part (G) of FIG. 7. The spread code reciprocal signal "g1" is fed from the division circuit 15 to a multiplier 4.

From the theoretical standpoint, when $S(t)=0$, the value of $1/S(t)$ is infinite. In fact, circuit frequency response characteristics, circuit dynamic ranges, and other factors provide a certain upper limit of the value of $1/S(t)$. Thus, great levels of the spread code reciprocal signal "g1" are limited as shown in the part (G) of FIG. 7.

The multiplier 3 multiplies the SS modulation signal $d(t) \cdot P(t)'$ and the delayed spread code $P(t-\tau)$, outputting a signal having a value of $d(t) \cdot S(t)$. It should be noted that the details of the calculation of deriving the value $d(t) \cdot S(t)$ from the values $d(t) \cdot P(t)'$ and $P(t-\tau)$ are omitted. In FIG. 6, the output signal $d(t) \cdot S(t)$ from the multiplier 3 is also denoted by the character "d1". The output signal "d1" from the multiplier 3 has a waveform such as shown in the part (D) of FIG. 7. The output signal "d1" from the multiplier 3 is fed to the multiplier 4.

The multiplier 4 multiplies the output signal $d(t) \cdot S(t)$ from the multiplier 3 and the spread code reciprocal signal $1/D(t)$, despreading the signal $d(t) \cdot S(t)$ with the spread code reciprocal signal $1/S(t)$ and thereby recovering the information signal $d(t)$. In FIG. 6, the recovered information signal $d(t)$ is also denoted by the character "h1". The recovered information signal "h1" has a waveform such as shown in the part (H) of FIG. 7. In fact, as shown in the part (H) of FIG. 7, the recovered information signal "h1" has small and negligible spike-shaped switching components which result from the previously-mentioned circuit frequency response characteristics, circuit dynamic ranges, and other factors.

The information signal "h1" is fed from the multiplier 4 to a low pass filter 12. The information signal "h1" is processed by the low pass filter 12. The output signal from the low pass filter 12 is transmitted from the present demodulation system to an external circuit (not shown) via an output terminal Out2. It is sufficient that the low pass filter 12 has a broad frequency cutoff characteristic and a simple structure. It should be noted that the low pass filter 12 may be omitted and the recovered information signal "h1" may be directly outputted from the demodulation system.

DESCRIPTION OF THE FOURTH PREFERRED EMBODIMENT

Figure 8:
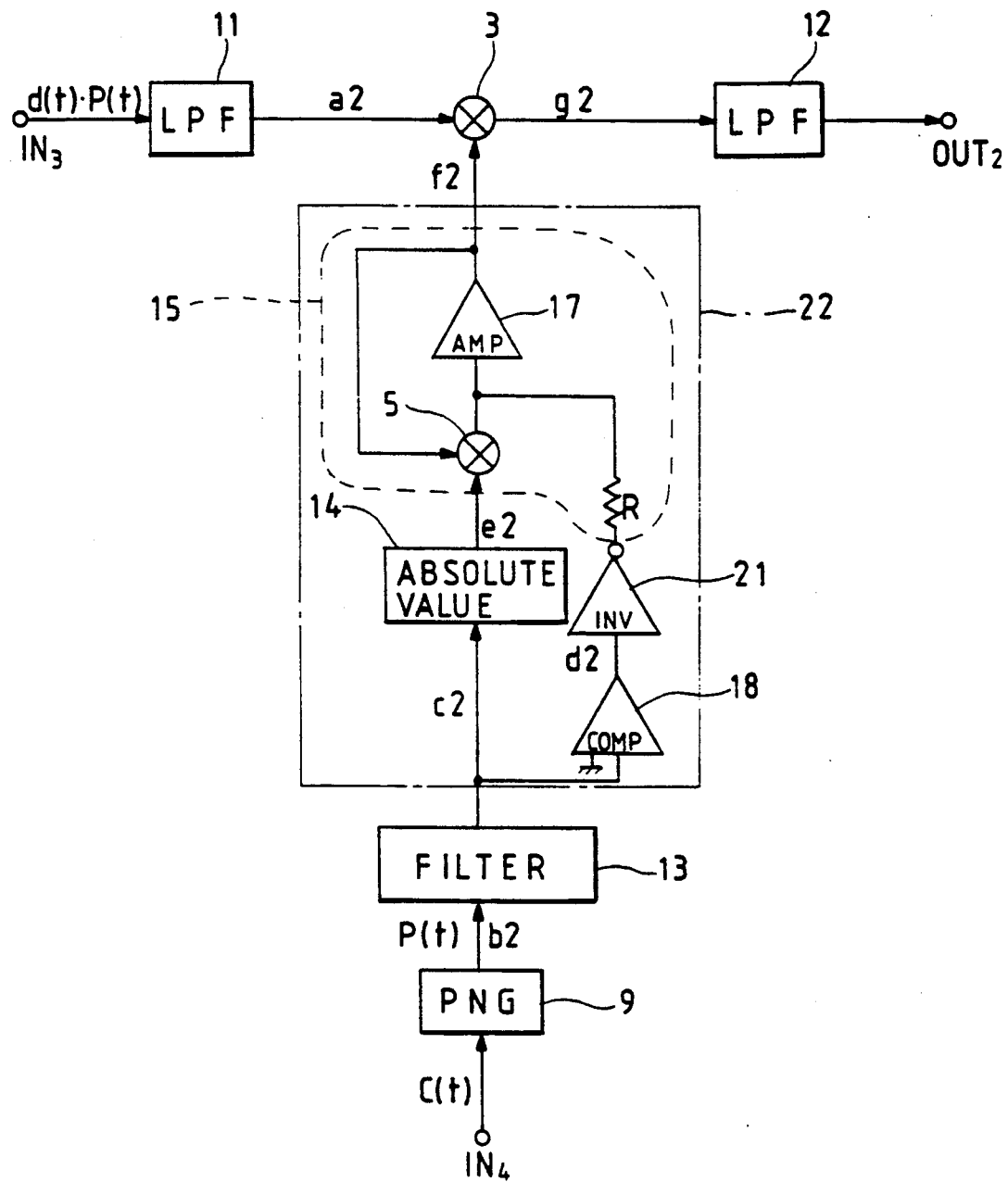
FIG. 8 is a block diagram of a spread spectrum demodulation system according to a fourth embodiment of this invention.

FIG. 8 shows a fourth embodiment of this invention which is similar to the embodiment of FIGS. 1-4 except for design changes indicated hereinafter.

In the embodiment of FIG. 8, a received SS modulation signal d(t)·P(t) is fed from an input terminal In3 to a low pass filter 11. High frequency components of the SS modulation signal d(t)·P(t) are removed by the low pass filter 11. In other words, the SS modulation signal d(t)·P(t) is differentiated by the low pass filter 11, and is thereby converted into a second SS modulation signal {d(t)·P(t)}'. Since the rate of a variation in the information signal d(t) is much smaller than that in the spread code P(t), the second SS modulation signal is approximately expressed as d(t)·P(t)'. In FIG. 8, the second SS modulation signal d(t)·P(t)' is also denoted by the character "a2". The second SS modulation signal "a2" has a waveform such as shown in the part (A) of FIG. 9. The second SS modulation signal "a2" is fed from the low pass filter 11 to a multiplier 3.

The low pass filter 11 serves to limit the frequency band of the input SS modulation signal d(t)·P(t). Generally, in spread spectrum communication, a range of frequencies up to the reciprocal of a bit clock period T is referred to as a main lobe of the frequency band of a spread spectrum signal. It is preferable that the low pass filter 11 removes components of the SS modulation signal d(t)·P(t) which have frequencies higher than the main lobe of the frequency band thereof.

A PNG 9 receives a clock signal C(t) via an input terminal In4, the received clock signal being equivalent to and synchronous with the clock signal in a modulation system 10 (see FIG. 1). The PNG 9 generates a spread code P(t) on the basis of the clock signal C(t). In FIG. 8, the generated spread code P(t) is also denoted by the character "b2". The spread code "b2" has a waveform such as shown in the part (B) of FIG. 9.

The spread code "b2" is fed from the PNG 9 to a low pass filter 13. High frequency components of the output spread code "b2" from the PNG 9 are removed by the low pass filter 13. The low pass filter 13 is designed so that the transfer function thereof is substantially equal to the transfer function of the low pass filter 11. The output spread code P(t) from the PNG 9 is differentiated by the low pass filter 13, and is thereby converted into a second spread code P(t)'. In FIG. 8, the second spread code P(t)' is also denoted by the character "c2". The second spread code "c2" has a waveform such as shown in the part (C) of FIG. 9. The second spread code "c2" is fed from the low pass filter 13 to an absolute value circuit 14 and a first input terminal of a comparator 18.

A second input terminal of the comparator 18 is subjected to a reference voltage (a ground potential) 0. The comparator 18 compares the spread code "c2" (see the part (C) of FIG. 9) and the reference voltage 0, outputting a delayed spread code "d2" which has a waveform such as shown in the part (D) of FIG. 9. Specifically, the comparator 18 outputs a signal +1 when the spread code "c2" assumes a positive level, and outputs a signal −1 when the spread code "c2" assumes a negative or zero level. The delayed spread code "d2" has a level P(t−τ). The delayed spread code P(t−τ) is fed from the comparator 18 to an inverter 21, being inverted by the inverter 21. The output signal from the inverter 21 is fed to a division circuit 15.

The absolute value circuit 14 inverts negative portions of the spread code "c2" but passes positive portions of the spread code "c2" as they are. Thus, the absolute value circuit 14 converts the spread code P(t)' into an absolute value spread code S(t) which is equal to the absolute value |P(t)'| of the spread code P(t)'. In FIG. 8, the absolute value spread code S(t) is also denoted by the character "e2". The absolute value spread code "e2" has a waveform such as shown in the part (E) of FIG. 9. The absolute value spread code "e2" is fed from the absolute value circuit 14 to the division circuit 15.

The division circuit 15 processes the absolute value spread code S(t) through division responsive to the inversion of the delayed spread code P(t−τ), outputting a spread code reciprocal signal 1/P(t)' which is equal to the reciprocal of the spread code P(t)'. In FIG. 8, the output spread code reciprocal signal 1/P(t)' from the division circuit 15 is also denoted by the character "f2". The output spread code reciprocal signal "f2" from the division circuit 15 has a waveform such as shown in the part (F) of FIG. 9. The spread code reciprocal signal "f2" is fed from the division circuit 15 to the multiplier 3, and will be used as a final spread code by the multiplier 3.

From the theoretical standpoint, when P(t)'=0, the value of 1/P(t)' is infinite. In fact, circuit frequency response characteristics, circuit dynamic ranges, and other factors provide a certain upper limit of the value of 1/P(t)'. Thus, great levels of the spread code reciprocal signal "f2" are limited as shown in the part (F) of FIG. 9.

The multiplier 3 multiplies the SS modulation signal d(t)·P(t)' and the final spread code 1/P(t)', despreading the SS modulation signal with the final spread code and thereby recovering the information signal d(t). In FIG. 8, the recovered information signal d(t) is also denoted by the character "g2". The recovered information signal "g2" has a waveform such as shown in the part (G) of FIG. 9. In fact, as shown in the part (G) of FIG. 9, the recovered information signal "g2" has small and negligible spike-shaped switching components which result from the previously-mentioned circuit frequency response characteristics, circuit dynamic ranges, and other factors.

The information signal "g2" is fed from the multiplier 3 to a low pass filter 12. The information signal "g2" is processed by the low pass filter 12. The output signal from the low pass filter 12 is transmitted from the present demodulation system to an external circuit (not shown) via an output terminal Out2. It is sufficient that the low pass filter 12 has a broad frequency cutoff characteristic and a simple structure. It should be noted that the low pass filter 12 may be omitted and the recovered information signal "g2" may be directly outputted from the present demodulation system.

As shown in FIG. 8, the division circuit 15 includes a multiplier 5, a resistor R, and an inverting amplifier 17. The multiplier 5 receives the output signal S(t) from the absolute value circuit 14. The multiplier 5 multiplies the signal S(t) and the output signal from the amplifier 17.

The output signal from the multiplier 5 is fed to the input terminal of the amplifier 17. In addition, the inversion of the delayed spread code "d2" is fed from the inverter 21 to the input terminal of the amplifier 17 via the resistor R. The output signal from the amplifier 17 is transmitted to the multiplier 3. In addition, the output signal from the amplifier 17 is fed back to the multiplier 5. The output signal from the amplifier 17 is equal to the spread code reciprocal signal $1/P(t)'$. It should be noted the details of the calculation of deriving the value $1/P(t)'$ from the value $|P(t)'|$ and the inversion of the value $P(t-\tau)$ are omitted.

DESCRIPTION OF THE FIFTH PREFERRED EMBODIMENT

Figure 10:
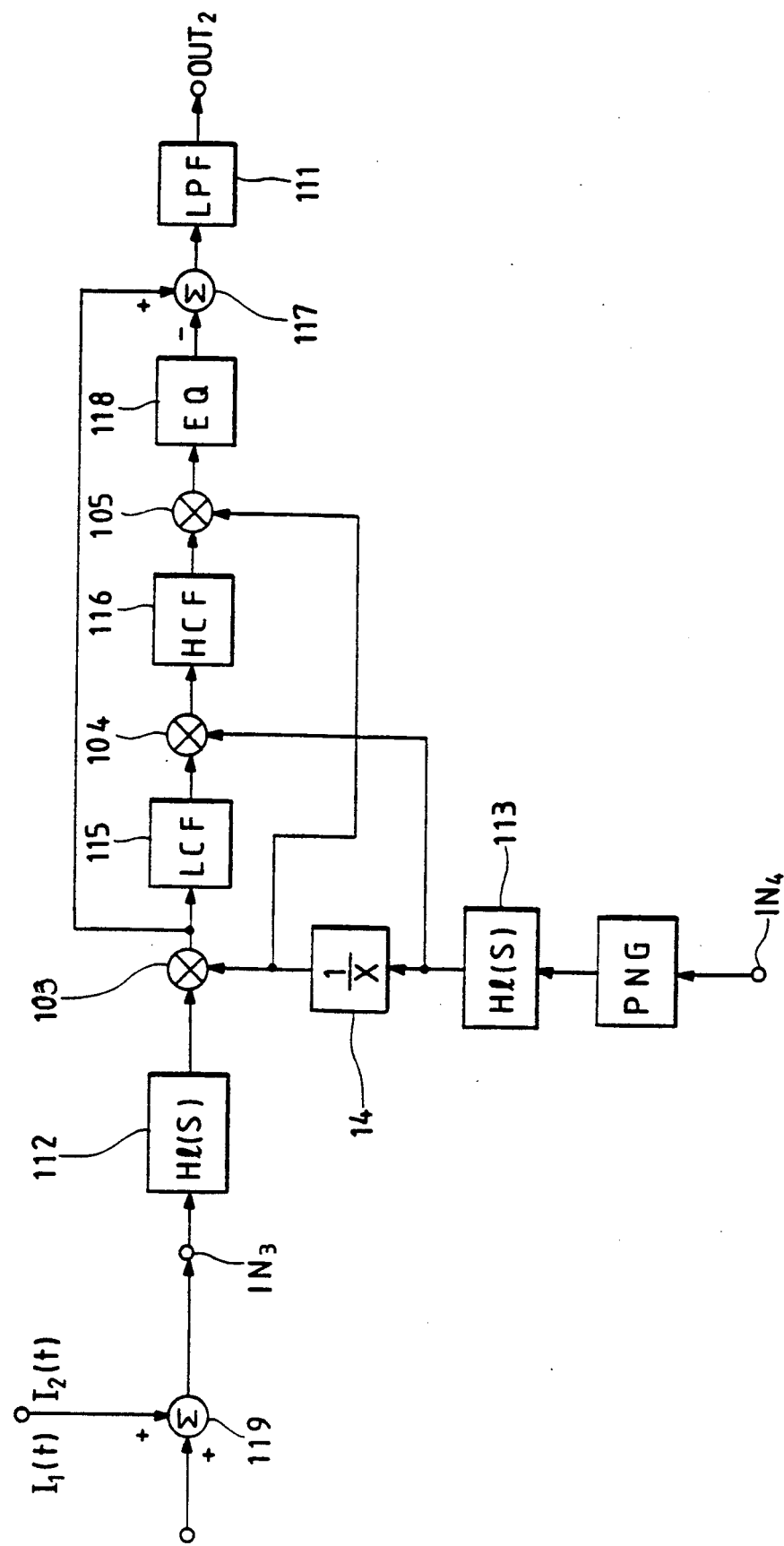
FIG. 10 is a block diagram of a spread spectrum demodulation system according to a fifth embodiment of this invention.

With reference to FIG. 10, a spread spectrum demodulation system includes multipliers 103-105, a PNG 109, a low pass filter 111, filters 112 and 113, a reciprocal circuit 114, a low cut filter (a high pass filter) 115, a high cut filter (a low pass filter) 116, a subtracter 117, and an equalizer 118. The filters 112 and 113 have a predetermined transfer function H(s). The design of the equalizer 118 is shown, for example, in U.S. patent application Ser. No. 762,885, filed on Sep. 19, 1991, the disclosure of which is hereby incorporated by reference.

Figure 11:
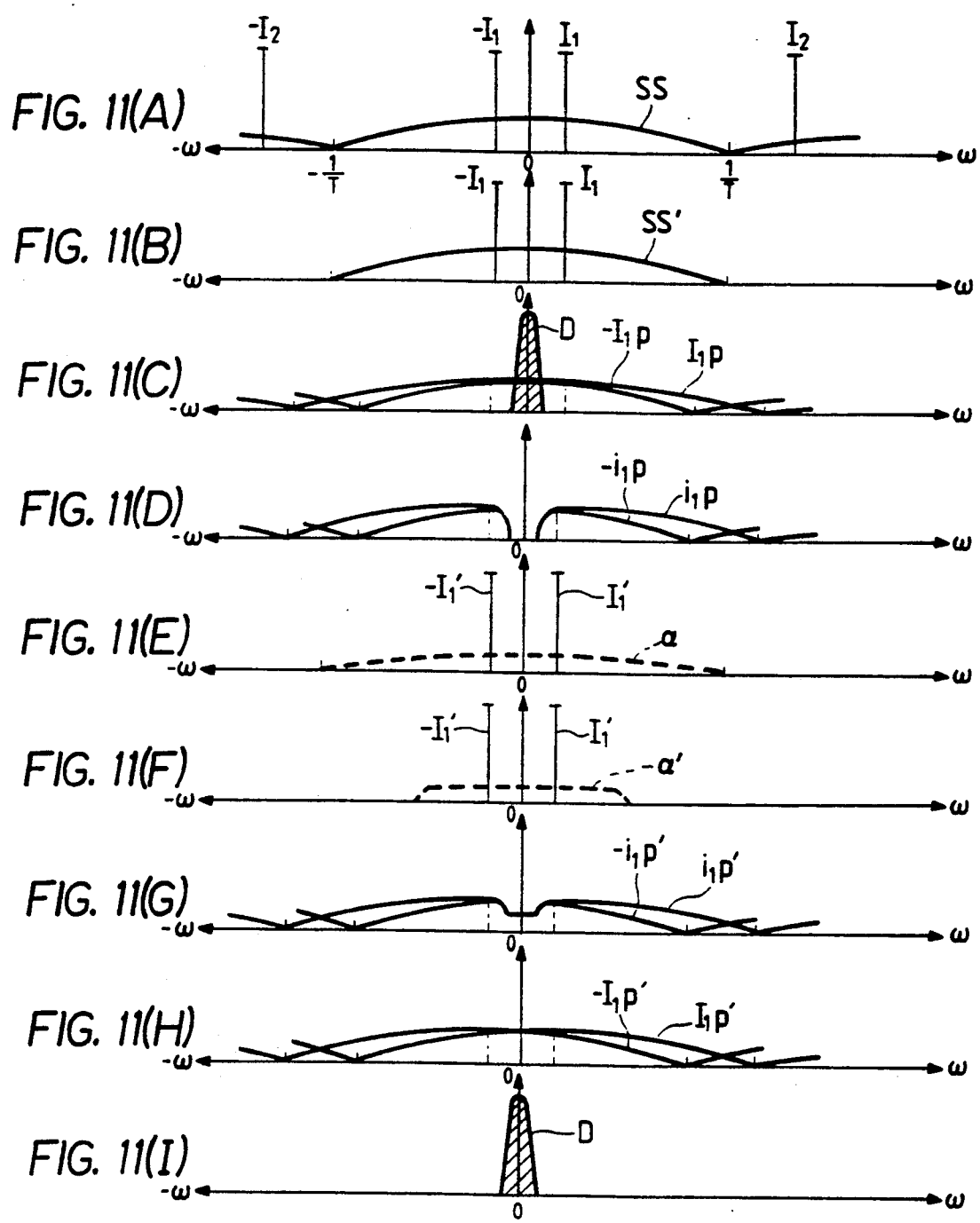
FIG. 11 is a frequency domain diagram showing the spectrums of various signals in the demodulation system of FIG. 10.

An input terminal In3 of the demodulation system is generally subjected to an SS modulation signal $d(t) \cdot P(t)$ and interference signals I1(t) and I2(t) such as jamming signals or noise. As shown in the part (A) of FIG. 11, the interference signals I1(t) and I2(t) are now presumed to be a low-frequency signal and a high-frequency signal respectively. The SS modulation signal $d(t) \cdot P(t)$ and the interference signals I1(t) and I2(t) compose an input signal $d(t) \cdot P(t) + I1(t) + I2(t)$ which is transmitted to the filter 112 via the input terminal In3.

The filter 112 is designed as a low pass filter. High frequency components of the input signal $d(t) \cdot P(t) + I1(t) + I2(t)$ are removed by the low pass filter 112. Specifically, the high-frequency interference signal I2(t) is removed, and high frequency components of the SS modulation signal $d(t) \cdot P(t)$ are removed. As a result, the filter 112 outputs a signal which is represented by $d(t)\{P(t)-P(t)'\}+I1(t)$. The output signal $d(t)\{P(t)-P(t)'\}+I1(t)$ from the filter 112 has a frequency spectrum such as shown in the part (B) of FIG. 11. The output signal $d(t)\{P(t)-P(t)'\}+I1(t)$ from the filter 112 is fed to the multiplier 103.

The low pass filter 112 serves to limit the frequency band of the SS modulation signal $d(t) \cdot P(t)$. Generally, in spread spectrum communication, a range of frequencies up to the reciprocal of a bit clock period T is referred to as a main lobe of the frequency band of a spread spectrum signal. It is preferable that the low pass filter 112 removes components of the SS modulation signal $d(t) \cdot P(t)$ which have frequencies higher than the main lobe of the frequency band thereof. A general PN code is composed of a given sequence of several hundreds of bits each having a level of either $+1$ or $-1$. These bits have a constant period which is referred to as a bit clock period T.

The PNG 109 receives a clock signal C(t) via an input terminal In4, the received clock signal being equivalent to and synchronous with the clock signal in a spread spectrum modulation system (not shown). The PNG 109 generates a spread code P(t) on the basis of the clock signal C(t). The spread code P(t) is fed from the PNG 109 to the filter 113. The spread code P(t) is processed by the filter 113. Since the transfer function of the filter 113 is substantially equal to the transfer function of the filter 112 and the filter 113 is designed as a low pass filter, the filter 113 outputs a second spread code which is represented by $P(t)-P(t)'$. The output spread code $P(t)-P(t)'$ from the filter 113 is fed to the reciprocal circuit 114 and the multiplier 104.

The reciprocal circuit 114 processes the spread code $P(t)-P(t)'$ through reciprocal-calculating division, outputting a spread code reciprocal signal $1/\{P(t)-P(t)'\}$ which is equal to the reciprocal of the spread code $P(t)-P(t)'$. The spread code reciprocal signal $1/\{P(t)-P(t)'\}$ is fed from the reciprocal circuit 114 to the multipliers 103 and 105.

The multiplier 103 multiplies the output signal $d(t)\{P(t)-P(t)'\}+I1(t)$ from the filter 112 and the spread code reciprocal signal $1/\{P(t)-P(t)'\}$, outputting a signal which is represented by $d(t)+I1(t)/\{P(t)-P(t)'\}$. The output signal $d(t)+I1(t)/\{P(t)-P(t)'\}$ from the multiplier 103 has a frequency spectrum such as shown in the part (C) of FIG. 11. The output signal $d(t)+I1(t)/\{P(t)-P(t)'\}$ from the multiplier 103 has the information signal components d(t) and the spread spectrum interference signal components $I1(t)/\{P(t)-P(t)'\}$. The output signal $d(t)+I1(t)/\{P(t)-P(t)'\}$ from the multiplier 103 is fed to the low cut filter 115 and the subtracter 117.

The low cut filter 115 removes low frequency components of the signal $d(t)+I1(t)/\{P(t)-P(t)'\}$. Specifically, the low cut filter 115 removes the information signal d(t). The low cut filter 115 outputs a signal which is represented by $I1(t)/\{P(t)-P(t)'\}-\alpha(t)$ where $\alpha(t)$ denotes the signal components removed by the low cut filter 115. The output signal $I1(t)/\{P(t)-P(t)'\}-\alpha(t)$ from the low cut filter 115 has a frequency spectrum such as shown in the part (D) of FIG. 11. The output signal $I1(t)/\{P(t)-P(t)'\}-\alpha(t)$ from the low cut filter 115 is fed to the multiplier 104.

The multiplier 104 multiplies the output signal $I1(t)/\{P(t)-P(t)'\}-\alpha(t)$ from the low cut filter 115 and the output spread code $P(t)-P(t)'$ from the filter 113, generating a signal which is represented by $I1(t)-\alpha(t)\{P(t)-P(t)'\}$. The generated signal $I1(t)-\alpha(t)\{P(t)-P(t)'\}$ has a frequency spectrum such as shown in the part (E) of FIG. 11. The generated signal $I1(t)-\alpha(t)\{P(t)-P(t)'\}$ is fed from the multiplier 104 to the high cut filter 116.

In this way, the multiplier 104 recovers the interference signal I1(t). In fact, the recovered interference signal I1(t) is approximately equal to the original interference signal, and the recovered interference signal I(t) is slightly lower in level than the original interference signal by a value corresponding to a loss in the low cut filter 115. In consideration of this fact, the recovered interference signal is denoted by the character I'1 in the part (E) of FIG. 11. For a similar reason, in the part (D) of FIG. 11, the spread spectrum interference signal components are represented by the character i1p.

The high cut filter 116 removes high frequency components of the signal $I1(t)-\alpha(t)\{P(t)-P(t)'\}$. Specifically, the high cut filter 116 removes high frequency components in a main lobe of the SS frequency band, limiting the band of the spread spectrum signal components $\alpha(t)\{P(t)-P(t)'\}$ but conducting the interference signal components I1(t) as they are. Thus, the high cut filter 116 outputs a signal which is represented by $I1(t)+\alpha(t)\{P(t)-P(t)'\}-\beta(t)$ where $\beta(t)$ denotes the signal components removed by the high cut filter 116. The output signal $I1(t)+\alpha(t)\{P(t)-P(t)'\}-\beta(t)$ from the high cut filter 116 has a frequency spectrum such as shown in the part (F) of FIG. 11. The output signal $I1(t)+\alpha(t)\{P(t)-P(t)'\}-\beta(t)$ from the high cut filter 116 is fed to the multiplier 105.

The multiplier 105 multiplies the output signal $I1(t)+\alpha(t)\{P(t)-P(t)'\}-\beta(t)$ from the high cut filter 116 and the spread code reciprocal signal $1/\{P(t)-P(t)'\}$, outputting a signal which is represented by $I1(t)/\{P(t)-P(t)'\}-\alpha(t)+\beta(t)/\{P(t)-P(t)'\}$. The output signal $I1(t)/\{P(t)-P(t)'\}-\alpha(t)+\beta(t)/\{P(t)-P(t)'\}$ from the multiplier 105 has a frequency spectrum such as shown in the part (G) of FIG. 11. The output signal $I1(t)/\{P(t)-P(t)'\}-\alpha(t)+\beta(t)/\{P(t)-P(t)'\}$ from the multiplier 105 is fed to the equalizer 118.

The equalizer 118 processes the signal $I1(t)/\{P(t)-P(t)'\}-\alpha(t)+\beta(t)/\{P(t)-P(t)'\}$. The signal components $-\alpha(t)$ are equal to unwanted spread spectrum interference signal components in the information data frequency band. The signal components $\beta(t)/\{P(t)-P(t)'\}$ are equal to unwanted spread spectrum interference signal components having a phase opposite to the phase of the signal components $-\alpha(t)$. The equalizer 118 nullifies or reduces the unwanted signal components $-\alpha(t)$ and $\beta(t)/\{P(t)-P(t)'\}$ to adequately low levels. Thus, the equalizer 118 compensates low frequency components of the signal $I1(t)/\{P(t)-P(t)'\}-\alpha(t)+\beta(t)/\{P(t)-P(t)'\}$, and thereby generates a signal which is represented by $I1(t)/\{P(t)-P(t)'+\gamma(t)$ where $\gamma(t)$ denotes the signal components compensated by the equalizer 118. The generated signal $I1(t)/\{P(t)-P(t)'+\gamma(t)$ has a frequency spectrum such as shown in the part (H) of FIG. 11. The generated signal $I1(t)/\{P(t)-P(t)'+\gamma(t)$ is fed from the equalizer 118 to the subtracter 117. The signal $I1(t)/\{P(t)-P(t)'+\gamma(t)$ will be used by the subtracter 117 as a reference spread spectrum background for suppressing the spread spectrum interference signal components.

The subtracter 117 subtracts the signal $I1(t)/\{P(t)-P(t)'+\gamma(t)$ from the signal $d(t)+I1(t)/\{P(t)-P(t)'\}$ outputted by the multiplier 103. The spread spectrum interference signal components $I1(t)/\{P(t)-P(t)'\}$ are cancelled, so that the subtracter 117 outputs a signal which is represented by $d(t)-\gamma(t)$. The output signal $d(t)-\gamma(t)$ from the subtracter 117 is fed to the low pass filter 111.

The low pass filter 111 removes the components $\gamma(t)$ of the signal $d(t)-\gamma(t)$, recovering the information signal $d(t)$ which is transmitted to an external circuit (not shown) via an output terminal Out2.

DESCRIPTION OF THE SIXTH PREFERRED EMBODIMENT

Figure 12:
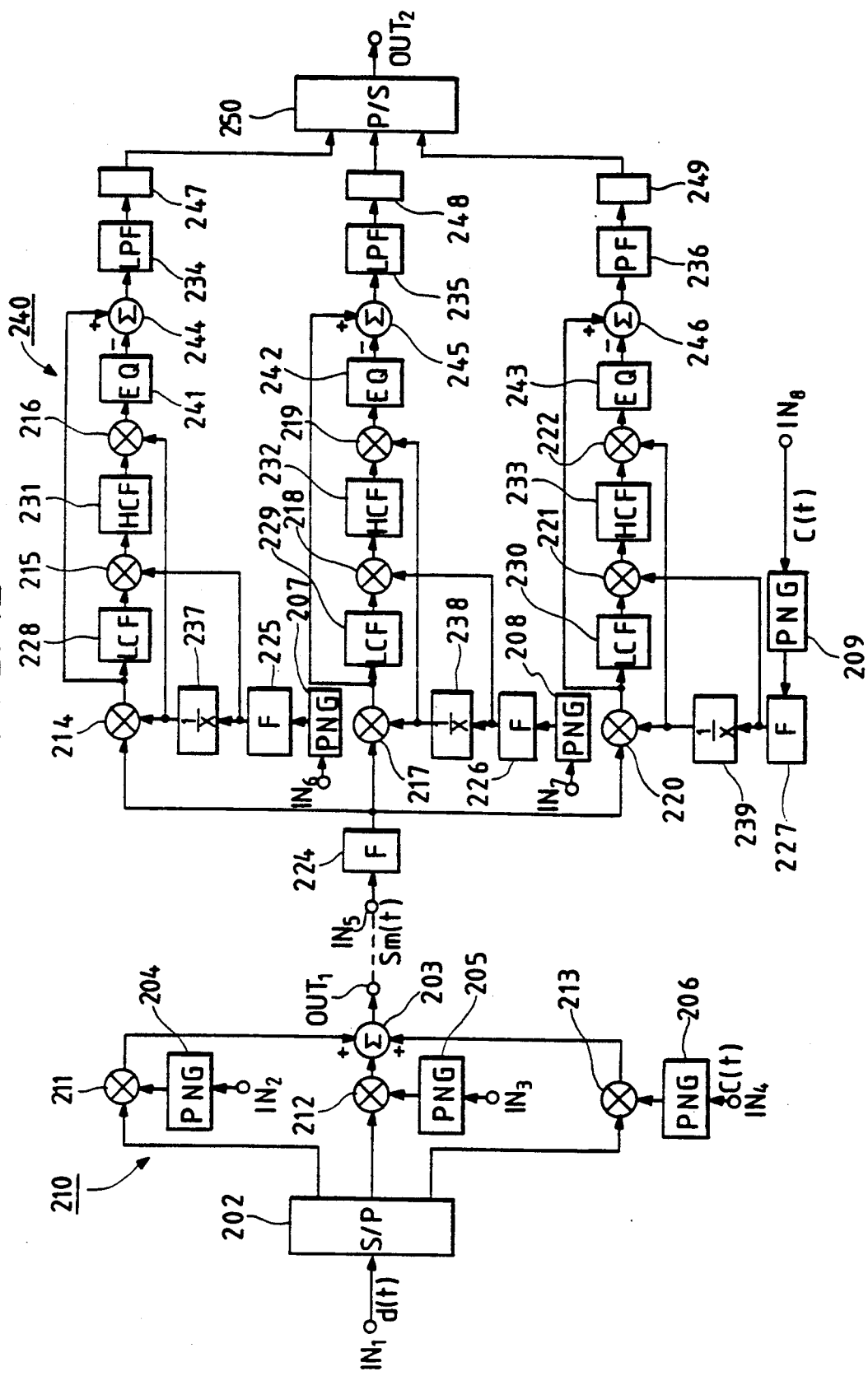
FIG. 12 is a block diagram of a spread spectrum modulation system and a spread spectrum demodulation system according to a sixth embodiment of this invention.

With reference to FIG. 12, a spread spectrum modulation system 210 includes a serial-parallel (S/P) converter 202, an adder 203, PNGs 204–206, and multipliers 211–213.

An information signal $d(t)$ is fed to the S/P converter 202 via an input terminal In1. The information signal $d(t)$ is separated by the S/P converter 202 into sub information signals $d1(t)$, $d2(t)$, and $d3(t)$ fed to the multipliers 211, 212, and 213 respectively.

A clock signal $C(t)$ is fed to the PNGs 204, 205, and 206 via input terminals In2, In3, and In4 respectively. The PNGs 204, 205, and 206 generate spread codes $P1(t)$, $P2(t)$, and $P3(t)$ on the basis of the clock signal $C(t)$. The generated spread codes $P1(t)$, $P2(t)$, and $P3(t)$ are different from each other. The spread codes $P1(t)$, $P2(t)$, and $P3(t)$ are fed from the PNGs 204, 205, and 206 to the multipliers 211, 212, and 213 respectively.

The multiplier 211 multiplies the information signal $d1(t)$ and the spread code $P1(t)$, modulating the information signal $d1(t)$ with the spread code $P1(t)$ and thereby converting the information signal $d1(t)$ into a spread spectrum (SS) modulation signal $d1(t) \cdot P1(t)$. The SS modulation signal $d1(t) \cdot P1(t)$ is fed from the multiplier 211 to the adder 203.

The multiplier 212 multiplies the information signal $d2(t)$ and the spread code $P2(t)$, modulating the information signal $d2(t)$ with the spread code $P2(t)$ and thereby converting the information signal $d2(t)$ into a spread spectrum (SS) modulation signal $d2(t) \cdot P2(t)$. The SS modulation signal $d2(t) \cdot P2(t)$ is fed from the multiplier 212 to the adder 203.

The multiplier 213 multiplies the information signal $d3(t)$ and the spread code $P3(t)$, modulating the information signal $d3(t)$ with the spread code $P3(t)$ and thereby converting the information signal $d3(t)$ into a spread spectrum (SS) modulation signal $d3(t) \cdot P3(t)$. The SS modulation signal $d3(t) \cdot P3(t)$ is fed from the multiplier 213 to the adder 203.

The adder 203 adds and combines the SS modulation signals $d1(t) \cdot P1(t)$, $d2(t) \cdot P2(t)$, and $d3(t) \cdot P3(t)$ into a sum SS modulation signal $Sm(t)$ which is expressed as follows.

$$Sm(t)=d1(t)\cdot P1(t)+d2(t)\cdot P2(t)+d3(t)\cdot P3(t)$$

The sum SS modulation signal $Sm(t)$ is transmitted from the modulation system to a propagation medium via an output terminal Out1.

A spread spectrum demodulation system 240 receives the sum SS modulation signal $Sm(t)$ via the propagation medium. The demodulation system 240 includes first, second, and third main sections which are similar to each other.

The first main section of the demodulation system 240 includes multipliers 214, 215, and 216, a PNG 207, a low pass filter 234, filters 224 and 225, a reciprocal circuit 237, a low cut filter (a high pass filter) 228, a high cut filter (a low pass filter) 231, a subtracter 244, and an equalizer 241.

The second main section of the demodulation system 240 includes multipliers 217, 218, and 219, a PNG 208, a low pass filter 235, filters 224 and 226, a reciprocal circuit 238, a low cut filter (a high pass filter) 229, a high cut filter (a low pass filter) 232, a subtracter 245, and an equalizer 242.

The third main section of the demodulation system 240 includes multipliers 220, 221, and 222, a PNG 209, a low pass filter 236, filters 224 and 227, a reciprocal circuit 239, a low cut filter (a high pass filter) 230, a high cut filter (a low pass filter) 233, a subtracter 246, and an equalizer 243.

The first, second, and third main sections of the demodulation system 240 are similar in structure and operation to the demodulation system of FIG. 10. The filter 224 is used in common by the first, second, and third main sections of the demodulation system 240. The received sum SS modulation signal $Sm(t)$ is fed to the filter 224 via an input terminal In5. The filter 224 corresponds to the filter 112 of FIG. 10. The output signal from the filter 224 is fed to the multipliers 214, 217, and 220 which correspond to the multiplier 103 of FIG. 10.

A clock signal $C(t)$ is fed to the PNGs 207, 208, and 209 of the first, second, and third main sections of the demodulation system 240 via input terminals In6, In7, and In8 respectively. In the first main section of the demodulation system 240, the PNG 207 generates a spread code P1(t) on the basis of the clock signal C(t), the spread code P1(t) being equal to and synchronous with the corresponding spread code P1(t) used in the modulation system 210. The spread code P1(t) is fed from the PNG 207 to the filter 225 which has a transfer function substantially equal to the transfer function of the filter 224. In the second main section of the demodulation system 240, the PNG 208 generates a spread code P2(t) on the basis of the clock signal C(t), the spread code P2(t) being equal to and synchronous with the corresponding spread code P2(t) used in the modulation system 210. The spread code P2(t) is fed from the PNG 208 to the filter 226 which has a transfer function substantially equal to the transfer function of the filter 224. In the third main section of the demodulation system 240, the PNG 209 generates a spread code P3(t) on the basis of the clock signal C(t), the spread code P3(t) being equal to and synchronous with the corresponding spread code P3(t) used in the modulation system 210. The spread code P3(t) is fed from the PNG 209 to the filter 227 which has a transfer function substantially equal to the transfer function of the filter 224.

As described previously, the first main section of the demodulation system 240 operates similarly to the operation of the demodulation system of FIG. 10. Specifically, the first main section of the demodulation system 240 processes the sum SS modulation signal Sm(t) while handling the signal components d1(t)·P1(t) as an information signal and handling the signal components d2(t)·P2(t) and d3(t)·P3(t) as interference signals. Thus, the first main section of the demodulation system 240 recovers the information signal d1(t) which is outputted from the low pass filter 234.

As described previously, the second main section of the demodulation system 240 operates similarly to the operation of the demodulation system of FIG. 10. Specifically, the second main section of the demodulation system 240 processes the sum SS modulation signal Sm(t) while handling the signal components d2(t)·P2(t) as an information signal and handling the signal components d1(t)·P1(t) and d3(t)·P3(t) as interference signals. Thus, the second main section of the demodulation system 240 recovers the information signal d2(t) which is outputted from the low pass filter 235.

As described previously, the third main section of the demodulation system 240 operates similarly to the operation of the demodulation system of FIG. 10. Specifically, the third main section of the demodulation system 240 processes the sum SS modulation signal Sm(t) while handling the signal components d3(t)·P2(t) as an information signal and handling the signal components d1(t)·P1(t) and d2(t)·P2(t) as interference signals. Thus, the third main section of the demodulation system 240 recovers the information signal d3(t) which is outputted from the low pass filter 235.

The recovered information signals d1(t), d2(t), and d3(t) are fed from the low pass filters 234, 235, and 236 to a parallel-serial (P/S) converter 250 via waveform shaping circuits 247, 248, and 249 respectively, being combined by the P/S converter 250 into the total information signal d(t). The total information signal d(t) is transmitted from the P/S converter 250 to an external circuit (not shown) via an output terminal Out2.

What is claimed is:

1. A demodulation system for spread spectrum communication, comprising:
    a first low pass filter for processing an input spread spectrum signal including a product of an information signal and a first spread code;
    means for generating a second spread code equivalent to the first spread code;
    a second low pass filter for processing the second spread code and having a transfer function substantially equal to a transfer function of the first low pass filter;
    an absolute value circuit for deriving an absolute value of an output signal from the second low pass filter;
    a division circuit for deriving a reciprocal of an output signal from the absolute value circuit;
    a delay circuit for delaying the second spread code by a predetermined time;
    a first multiplier for multiplying an output signal from the division circuit and an output signal from the delay circuit, and for generating a third spread code in response to the output signals from the division circuit and the delay circuit; and
    a second multiplier for multiplying an output signal from the first low pass filter and the third spread code, for despreading the output signal from the first low pass filter with the third spread code, and for recovering the information signal from the output signal of the first low pass filter.

2. The demodulation system of claim 1 wherein the delay circuit comprises a comparator which compares the output signal from the second low pass filter and a predetermined reference signal, and means for feeding on output signal from the comparator to the first multiplier as the output signal from the delay circuit.

3. A demodulation system for spread spectrum communication, comprising:
    a first low pass filter for processing an input spread spectrum signal including a product of an information signal and a first spread code;
    means for generating a second spread code equivalent to the first spread code;
    a second low pass filter for processing the second spread code and having a transfer function substantially equal to a transfer function of the first low pass filter;
    an absolute value circuit for deriving an absolute value of an output signal from the second low pass filter;
    a comparator for comparing the output signal from the second low pass filter and a predetermined reference signal;
    an inverter for inverting an output signal from the comparator;
    a division circuit for executing a division between an output signal from the absolute value circuit and an output signal from the inverter, and for generating a third spread code in response to the output signals from the absolute value circuit and the inverter; and
    a second multiplier for multiplying an output signal from the first low pass filter and the third spread code, for despreading the output signal from the first low pass filter with the third spread code, and for recovering the information signal from the output signal of the first low pass filter.

4. A demodulation system for spread spectrum communication, comprising:

a first low pass filter for processing an input spread spectrum signal including a product of an information signal and a first spread code;

means for generating a second spread code equivalent to the first spread code;

a delay circuit for delaying the second spread code by a predetermined time;

a first multiplier for multiplying an output signal from the first low pass filter and an output signal from the delay circuit;

a second low pass filter for processing the second spread code and having a transfer function substantially equal to a transfer function of the first low pass filter;

an absolute value circuit for deriving an absolute value of an output signal from the second low pass filter;

a division circuit for deriving a reciprocal of an output signal from the absolute value circuit; and a second multiplier for multiplying an output signal from the first multiplier and an output signal from the division circuit, and for recovering the information signal from the output signal of the first multiplier.

5. A demodulation system for spread spectrum communication, comprising:

a low pass filter for processing an input spread spectrum signal including a product of an information signal and a first spread code, wherein the first spread code in the input spread spectrum signal undergoes a change during the processing by the low pass filter;

means for generating a second spread code equivalent to the first spread code;

means for correcting the second spread code into a third spread code in accordance with said change; and means for despreading an output signal of the low pass filter with the third spread code to recover the information signal from the output signal of the low pass filter.

6. A demodulation system for spread spectrum communication, comprising:

a first low pass filter for processing an input spread spectrum signal which includes a product of an information signal and a first spread code and which also includes an interference signal;

means for generating a second spread code equivalent to the first spread code;

a second low pass filter for processing the second spread code into a third spread code and having a transfer function substantially equal to a transfer function of the first low pass filter;

a reciprocal circuit for deriving a reciprocal of an output signal from the second low pass filter;

a first multiplier for multiplying an output signal from the first low pass filter and an output signal from the reciprocal circuit, and for despreading the output signal from the first low pass filter with the output signal from the reciprocal circuit;

a low cut filter for processing an output signal from the first multiplier, and for removing a component of the output signal from the first multiplier which corresponds to a demodulation of the information signal;

a second multiplier for multiplying the third spread code and an output signal from the low cut filter;

a high cut filter for processing an output signal from the second multiplier;

a third multiplier for multiplying the output signal from the reciprocal circuit and an output signal from the high cut filter, and for generating a spectrum of a spread of the interference signal in response to the output signals from the reciprocal circuit and the high cut filter;

an equalizer for processing an output signal from the third multiplier, and for correcting the spread spectrum of the interference signal into a spread spectrum which is substantially equal to a spectrum of a spread of the interference signal contained in the output signal from the first multiplier;

a subtracter for executing a subtraction between the output signal from the first multiplier and an output signal from the equalizer; and a third low pass filter for recovering the information signal from an output signal of the subtracter.

7. A spread spectrum communication system comprising:

a serial-parallel converter for separating an input serial information signal into N sub information signals, wherein N is an integer greater than 1;

means for spreading the N sub information signals with first N different spread codes to convert the N sub information into N spread spectrum modulation signals respectively;

means for adding the N spread spectrum modulation signals into a sum spread spectrum modulation signal;

a low pass filter for processing the sum spread spectrum modulation signal;

N demodulation circuits for recovering the N sub information signals from an output signal of the low pass filter; and a parallel-serial converter for combining the recovered N sub information signals into the recovered input serial information signal;

wherein the N demodulation circuits comprise means for generating second N spread codes which are equivalent to the first N spread codes respectively, means for despreading the output signal of the low pass filter with the second N spread codes respectively, and means for reducing inter-code interference noise in output signals from the despreading means respectively, and for deriving the recovered N sub information signals from the output signals of the despreading means.

8. The spread spectrum communication system of claim 7 wherein each of the noise-reducing means comprises:

a correcting filter for processing the second spread code into a third spread code and having a transfer function substantially equal to a transfer function of the low pass filter;

a reciprocal circuit for deriving a reciprocal of an output signal from the correction filter;

a first multiplier for multiplying the output signal from the low pass filter and an output signal from the reciprocal circuit, and for despreading the output signal from the low pass filter with the output signal from the reciprocal circuit;

a low cut filter for processing an output signal from the first multiplier, and for removing a component of the output signal from the first multiplier which corresponds to a demodulation of the information signal;

a second multiplier for multiplying the third spread code and an output signal from the low cut filter;

a high cut filter for processing an output signal from the second multiplier;

a third multiplier for multiplying the output signal from the reciprocal circuit and an output signal from the high cut filter, and for generating a spectrum of a spread of the inter-code interference noise in response to the output signals from the reciprocal circuit and the high cut filter;

an equalizer for processing an output signal from the third multiplier, and for correcting the spread spectrum of the inter-code interference noise into a spread spectrum which is substantially equal to a spectrum of a spread of the inter-code interference noise contained in the output signal from the first multiplier;

a subtracter for executing a subtraction between the output signal from the first multiplier and an output signal from the equalizer; and a second low pass filter for recovering the information signal from an output signal of the subtracter.

9. In a spread spectrum communication system, the improvement comprising:

low pass filter means for changing a first spreading sequence of an input spread spectrum signal including a product of an information signal and the first spreading sequence, means for generating a second spreading sequence, and means for correcting the second spreading sequence into a third spreading sequence in accordance with the change provided by said low pass filter means.

* * * * *